Feb. 6, 1951     J. H. ENGELN ET AL     2,540,572
RIVET CHUCK
Filed May 28, 1945
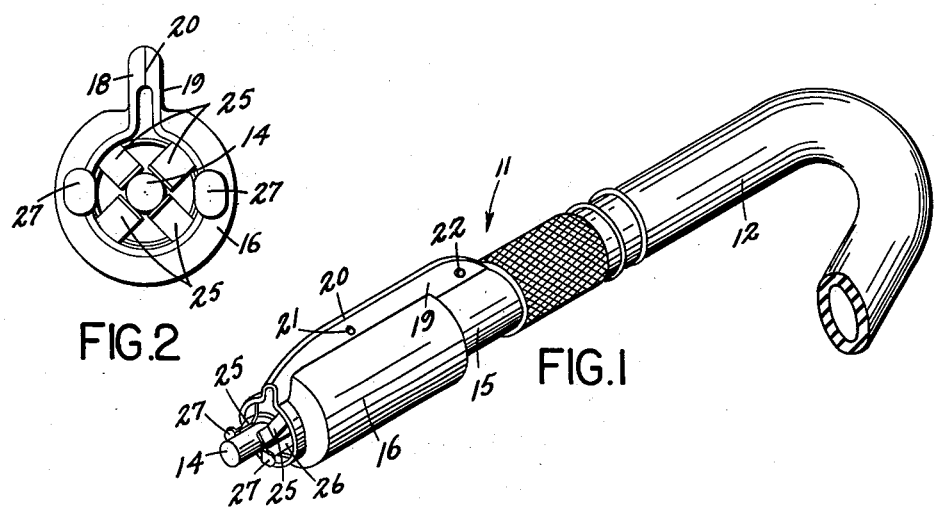
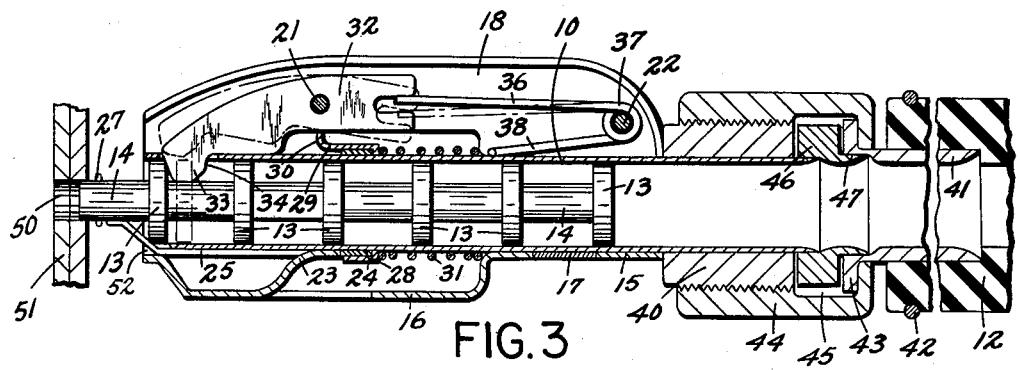
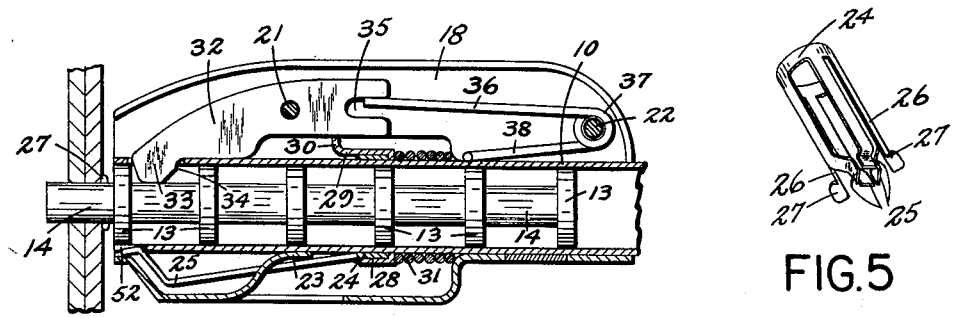
INVENTORS
JOHN H. ENGELN
EUGENE W. LEHMAN
BY   LLOYD G. SPETH
Kwis, Hudson, Boughton & Williams
ATTORNEYS Patented Feb. 6, 1951

2,540,572

UNITED STATES PATENT OFFICE 2,540,572

RIVET CHUCK

John H. Engeln, Cleveland, Eugene W. Lehman, East Cleveland, and Lloyd G. Speth, Cleveland, Ohio, assignors to The Cleveland Pneumatic Tool Company, Cleveland, Ohio, a corporation of Ohio Application May 28, 1945, Serial No. 596,376

3 Claims. (Cl. 78—46)

This invention relates to improvements in rivet chucks, that is to say chucks for inserting rivets one at a time into previously prepared rivet holes with a relatively small expenditure of time and effort. The chuck of the present invention is intended primarily for use in connection with a rivet feeder of the character illustrated and described in the application of Paul Van Sittert, Milton J. Garrett, and John H. Engeln, Serial No. 596,375, filed of even date herewith.

In a rivet feeder of that type rivets are deposited from a hopper into a chute and transferred by an intermittently acting valve mechanism into a delivery tube which comprises a flexible hose of substantial length with a chuck on its free end. A column of rivets in the hose and extending forwardly into the chuck is exposed to pressure fluid, such as compressed air, for urging the rivets toward the discharge end of the chuck and advancing the column each time that a rivet is fed into the work. The chuck of the present invention supports the first rivet of the column with its shank extending forward somewhat beyond the free end of the chuck, so that the shank may be readily guided into a hole in the work. Thereafter the operator presses the chuck toward the work, and this action serves to release the grip of the chuck upon the rivet, permitting the pressure at the rear of the column to force the first rivet forward until its head engages the surface of the work. The chuck mechanism includes a detent or gate which functions while the first rivet is being discharged to hold the second rivet and the column behind it against forward movement.

One of the objects of the invention is the provision of a chuck of simple construction which is especially adapted for use upon a delivery tube employing compressed air as a means for advancing the rivets toward the work.

Another object is the provision of improved means for preventing the accidental discharge of more than one rivet at a time.

A further object is the provision of a yieldable detent for the second rivet of the column with means for positively locking the detent against withdrawal during the time that the means for gripping the first rivet is displaced.

Still another object is the provision of means for trapping oversize rivets and enabling the operator to withdraw them readily and quickly.

Other objects and features of novelty will appear as we proceed with the description of that embodiment of the invention which, for the purposes of the present application, we have illustrated in the accompanying drawings, in which Fig. 1 is a perspective view of a chuck embodying the invention shown connected with a fragment of a hose through which rivets may be fed to the chuck.

Fig. 2 is a view of the delivery end of the chuck.

Fig. 3 is a longitudinal sectional view of the chuck on a larger scale showing the device in position for inserting a rivet in the work.

Fig. 4 is a similar view showing the first rivet in the course of being inserted in the work and the detent in operative position for checking the advance of the second rivet and the column of rivets behind it, and Fig. 5 is a perspective detail view of the rivet gripping fingers and associated parts.

In the drawing 10 represents a tubular conductor forming the main element of the chuck, which is indicated generally at 11, and is adapted to be connected with a flexible hose 12 of any desired length which enables the operator to move the chuck about to whatever extent may be necessary or desirable for performing the work required of the device. This conductor 10 and hose 12 will be referred to hereinafter as together constituting a delivery tube. The delivery tube 10, 12 has an internal bore of a size such that the heads 13 of the rivets being handled by the apparatus may slide readily in the tube but will fit closely enough so that collectively they will prevent any great amount of leakage of pressure fluid until the number of rivets in the column is reduced to a half dozen or thereabouts. When this occurs a new supply should be introduced into the delivery tube by suitable means such as that illustrated in the copending application referred to. As indicated in the drawing the shank 14 of each rivet engages the head of the rivet next in advance, while the shank of the first rivet of the column projects somewhat beyond the forward end of the chuck.

The tubular conductor 10 is surrounded by a housing comprising two partially cylindrical parts 15 and 16, the part 15 being secured to the tube 10 by suitable means, preferably by a weld indicated at 17. This housing includes also two parallel walls 18, 19 which are rather close together and are disposed on opposite sides of a longitudinal plane through the axis of tube 10. The outer edges of these walls incline toward each other and are secured together as by a seam weld 20. Two pivots 21 and 22 are mounted in the walls 18, 19. At one point in the periphery of the part 16 of the housing a lip 23 is struck inwardly to bear against the tube 10 and constitute a stop, as will presently appear.

A collar 24 loosely surrounds tubular conductor 10. Integral with it are several resilient fingers 25 with inwardly bent extremities which, in the normal or inactive position of the parts, extend forwardly of and therefore grip the head 13 of the first rivet, as shown in Fig. 3. Also integral with collar 24 are a pair of oppositely disposed legs 26 with feet 27. A ring 28 surrounds and is attached to collar 24 and serves to reenforce it. This ring has a projection 29 with an outwardly extending lip 30. At the rearward edge of ring 28 there is an inwardly bent flange against which bears one end of a compression spring 31 surrounding the tubular conductor, the opposite end bearing against the part 15 of the housing. The expansion of spring 31 is limited by the engagement of collar 24 with lip 23, as shown in Fig. 3.

A lever 32 is mounted on pivot pin 21 between the walls 18 and 19. At its forward end it has a projection constituting a detent 33 which is adapted to project through a slot in tube 10. The rear edge of this detent is cam shaped as indicated at 34. Lever 32 at its rear end is provided with a slot 35 into which projects one extension leg 36 of a torsion spring 37 coiled around pivot 22, the other leg 38 of the spring bearing against the tube 10. This spring tends to swing lever 32 to the full line position of Fig. 3 and thereby hold the detent 33 in operative position. Lip 30 on ring 38 normally engages lever 32 substantially opposite pivot 21, or slightly forward of the pivot. In that position it offers no opposition to the swinging of the lever from the full line to the broken line position of Fig. 3. When however collar 24 is moved rearwardly with respect to tube 10 to the position of Fig. 4, lip 30 interposes a positive stop preventing the tilting of the lever in the clockwise direction.

Tube 10 has a threaded collar 40 secured thereto near its rear extremity forming the male member of a coupling. Hose 12 is counterbored to receive a nipple 41 of the same internal diameter as the hose, the nipple being held in place by a clamping ring 42 or the like. A flange 43 on nipple 41 serves as a retainer for a female coupling member 44 which is internally threaded for engagement with the coupling member 40. Member 44 is formed to provide an annular cavity 45 when the coupling is in operative position, and this cavity receives a gauge ring 46 which has a sliding fit upon the protruding end of the tube 10 so as to properly center the ring. An extension 47 of ring 46 extends into a countersunk part of nipple 41 and has a minimum internal diameter slightly less than that of tube 10. Hence any rivet with an oversize head will be caught by the gauge ring. When this occurs the operator may cut off the compressed air supply to the hose 12, unscrew the coupling member 44 and withdraw the rivet trapped by the gauge ring 46, 47, after which the parts may be reassembled and the compressed air again turned on.

In the operation of the device the chuck is advanced toward a rivet hole 50 in work 51, and the protruding end of the shank 14 of the first rivet caused to enter the hole. Then the operator pushes the tube 10 and housing 15, 16 forward, causing the feet 27 to engage the surface of the work. Further pressure on the chuck causes the tube 10 to advance while the feet 27, legs 26 and collar 24 remain stationary. The forward end of tube 10 is provided with short slots 52 through which the inwardly deflected ends of fingers 25 extend. As the tube 10 moves forward the ends of these slots cam the fingers outward toward the position of Fig. 4 to release the head of the first rivet. At the same time the lip 30 moves rearward toward the position of Fig. 4 and locks the lever 32 in the position in which the detent 33 extends into the tube between the heads of the first and second rivets. As soon as the head of the first rivet is released the pressure behind the column of rivets will snap the first one into place in the work. The operator then withdraws the chuck, which relieves the spring 31 from compression, causing the lip 30 to advance to the Fig. 3 position. The pressure behind the column of rivets thereupon causes the column to advance, pushing the head of the second rivet against the cam surface 34 of the detent 33, this force being sufficient to rock lever 32 to the broken line position of Fig. 3 against the action of spring 36, 37, 38. The fingers 25 having in the meantime returned to gripping position retain the second rivet, and the spring 36, 37, 38 swings the lever 32 back to its operative position. The apparatus is thus in condition for the insertion of the second rivet in another rivet hole. In case a rivet hole is slightly undersize or a rivet shank slightly oversize so that the operator must exert strong pressure to make the rivet enter the hole, the forward edge of the detent 33 will serve to transmit this pressure to the rivet head.

Having thus described our invention, we claim:

1. In a rivet chuck, a delivery tube adapted to contain a column of rivets having heads slidably fitting within the tube, a collar slidable upon said tube, resilient fingers carried by said collar having inwardly bent extremities adapted to engage and hold the first rivet of said column, feet also carried by said collar for engagement with the work, spring means urging said collar and fingers toward rivet holding position and adapted to yield when said feet are pressed against the work by the advancement of said tube, said tube being adapted to engage said fingers and cam them outwardly to release the first rivet, a lever pivoted on said tube having a detent normally positioned behind said first rivet to prevent discharge of the second rivet, spring means to hold said detent in operative position, and a projection on said collar normally engaging said lever opposite its pivot but moving lengthwise of the lever into position to prevent withdrawal of the detent when the collar and fingers are moved toward rivet releasing position by the advancement of the tube.

2. In a rivet chuck, a delivery tube adapted to contain a column of rivets having heads slidably fitting within the tube, a housing carried by said tube having two spaced parallel walls on opposite sides of a plane radially positioned with respect to said tube, two pivots mounted in said parallel walls, a lever detent mounted on one of said pivots with a nose portion normally extending into the tube between the first and second rivets of said column, and a spring mounted on the other pivot for biasing said lever detent toward operative position.

3. In a rivet chuck, a delivery tube adapted to contain a column of rivets having heads slidably fitting within the tube, a member slidable with respect to said tube, resilient fingers carried by said slidable member having inwardly bent extremities adapted to engage and hold the first rivet of said column, feet also carried by said slidable member for engagement with the work, spring means urging said slidable member and fingers toward rivet holding position and adapted to yield when said feet are pressed against the work by the advancement of said tube, relative movement between said tube and slidable member causing outward movement of the fingers to release the first rivet, a lever pivoted on said tube having a detent normally positioned behind said first rivet to prevent discharge of the second rivet, spring means to hold said detent in operative position, and a projection on said slidable member normally engaging said lever opposite its pivot but moving lengthwise of the lever into position to prevent withdrawal of the detent when the slidable members and fingers are moved toward rivet releasing position by the advancement of the tube.

JOHN H. ENGELN.
EUGENE W. LEHMAN.
LLOYD G. SPETH.

REFERENCES CITED

The following references are of record in the file of this patent:

UNITED STATES PATENTS

| Number | Name | Date |
| --- | --- | --- |
| 273,448 | Borchardt | Mar. 6, 1883 |
| 305,050 | Cook | Sept. 16, 1884 |
| 602,068 | Ferguson | Apr. 12, 1898 |
| 1,228,505 | Wesson | June 5, 1917 |
| 1,559,825 | Wilson | Nov. 3, 1925 |
| 2,070,291 | McHugh | Feb. 9, 1937 |
| 2,087,920 | Mascuch | July 27, 1937 |
| 2,330,052 | Henry | Sept. 21, 1943 |
| 2,337,506 | Tea | Dec. 21, 1943 |
| 2,366,448 | Greene | Jan. 2, 1945 |
| 2,373,509 | Speth | Apr. 10, 1945 |
| 2,390,318 | Offutt | Dec. 4, 1945 |
| 2,397,872 | Kovacs | Apr. 2, 1946 |